US010135297B2

(12) United States Patent
Wakabayashi

(10) Patent No.: US 10,135,297 B2
(45) Date of Patent: Nov. 20, 2018

(54) WIRELESS POWER FEEDER

(71) Applicant: Funai Electric Co., Ltd., Osaka (JP)

(72) Inventor: Naoyuki Wakabayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 97 days.

(21) Appl. No.: 15/235,234

(22) Filed: Aug. 12, 2016

(65) Prior Publication Data

US 2016/0352137 A1 Dec. 1, 2016

Related U.S. Application Data

(63) Continuation of application No. 14/242,176, filed on Apr. 1, 2014, now Pat. No. 9,438,068.

(30) Foreign Application Priority Data

Apr. 3, 2013 (JP) .................................. 2013-077972

(51) Int. Cl.
*H02J 7/00* (2006.01)
*H02J 50/10* (2016.01)
*H02J 50/80* (2016.01)
*H02J 50/90* (2016.01)
*H02J 7/02* (2016.01)
*H02J 17/00* (2006.01)
*H02J 50/40* (2016.01)

(52) U.S. Cl.
CPC .............. *H02J 50/10* (2016.02); *H02J 7/025* (2013.01); *H02J 7/027* (2013.01); *H02J 17/00* (2013.01); *H02J 50/40* (2016.02); *H02J 50/80* (2016.02); *H02J 50/90* (2016.02); *H02J 7/007* (2013.01)

(58) Field of Classification Search
CPC ...................................................... H02J 50/10
USPC .......................................................... 320/108
See application file for complete search history.

(56) References Cited

U.S. PATENT DOCUMENTS

| 5,657,257 | A | 8/1997 | Lee |
| 5,808,881 | A | 9/1998 | Lee |
| 2007/0182367 | A1 | 8/2007 | Partovi |
| 2009/0033280 | A1 | 2/2009 | Choi et al. |
| 2012/0001592 | A1 | 1/2012 | Fukaya |
| 2012/0319645 | A1 | 12/2012 | O'Donnell et al. |
| 2014/0145516 | A1* | 5/2014 | Hirosawa ............ B60L 11/182 307/104 |

FOREIGN PATENT DOCUMENTS

| JP | 2009-525715 A | 7/2009 |
| JP | 2010/183812 A | 8/2010 |
| WO | 2013/015416 A1 | 1/2013 |

OTHER PUBLICATIONS

Office Action issued in corresponding Japanese Application No. 2013-077972 dated Jan. 24, 2017, and English translation thereof (8 pages).

Extended European Search Report in corresponding European Application No. 14162935.2 dated Apr. 8, 2015 (7 pages).

* cited by examiner

*Primary Examiner* — Suresh Memula
(74) *Attorney, Agent, or Firm* — Osha Liang LLP

(57) ABSTRACT

A wireless power feeder includes a plurality of coils and a controller that determines a first coil from the plurality of coils based on power transmitted from each of the plurality of coils to an external apparatus. The first coil receives power from a power source.

16 Claims, 6 Drawing Sheets

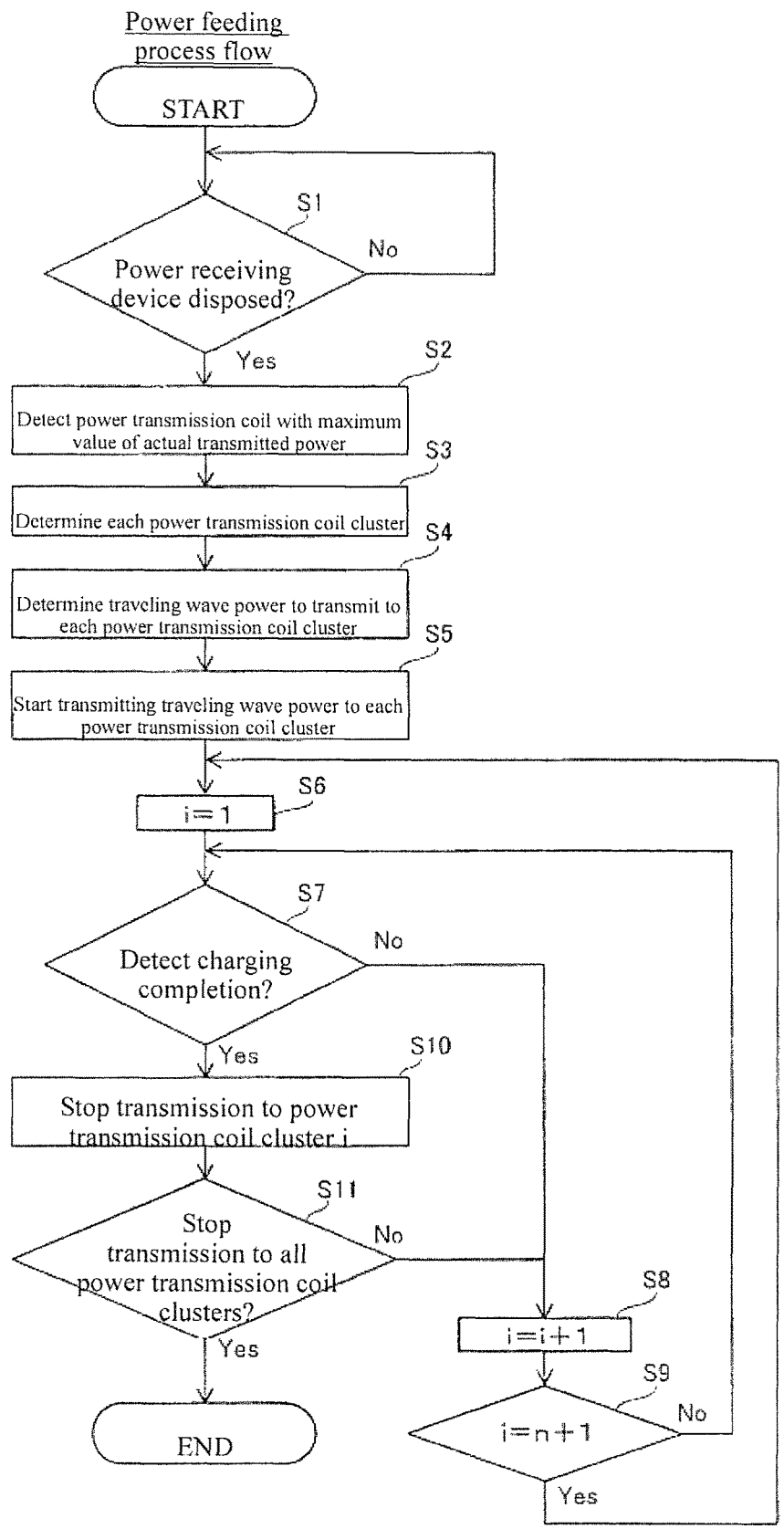

WIRELESS POWER FEEDER

CROSS-REFERENCE TO RELATED APPLICATIONS

The present application is a continuation application of and, thereby, claims benefit under 35 U.S.C. § 120 to U.S. patent application Ser. No. 14/242,176 filed on Apr. 1, 2014, titled, "WIRELESS POWER FEEDER," which claims priority to Japanese Patent Application No. 2013-077972 filed on Apr. 3, 2013, according to the Paris Convention. The contents of the priority applications are incorporated by reference in their entirety.

TECHNICAL FIELD

This invention relates to a non-contact power feeder and particularly to a non-contact power feeder provided with a power transmission coil and a non-contact power feeding method that transmits power via the power transmission coil.

BACKGROUND TECHNOLOGY

Conventionally, a non-contact power feeder provided with a plurality of power transmission coils is known (for example, see Patent Document 1).

Disclosed in Patent Document 1 described above is a transmission coil array that arranges a plurality of transmission coils (power transmission coils) for inducing charging power in a reception coil (power reception coil) of a battery device (power receiving device) to be charged, and a contactless charging device (non-contact power feeder) that uses a communication module to detect the transmission coil magnetically coupled with the reception coil and has a driving means that selectively drives only the detected transmission coil. This contactless charging device may be configured to pass a current of a predetermined value through the transmission coil and thereby transmit a traveling wave power of a predetermined size to the transmission coil and charge the battery device.

RELATED ART DOCUMENTS

Patent Documents

[Patent Document 1] Japanese Application Publication No. 2009-525715

However, in the contactless charging device (non-contact power feeder) in Patent Document 1 described above, because power of a predetermined size is continuously transmitted to the transmission coil regardless of power reception characteristics of the battery device (power receiving device), there is a disadvantage in the battery device with small received power relative to the traveling wave of the contactless charging device where power is needlessly consumed because power transmitted to the power transmission coil is relatively large. That is, in the contactless charging device of Patent Document 1 described above, charging efficiency drops in certain situations.

SUMMARY OF THE INVENTION

One or more embodiments of the invention provide a non-contact power feeder that can improve charging efficiency by reducing needless power consumption during charging and shorten a charging time. The following summary is provided for illustration purposes.

A non-contact power feeder according to one or more embodiments, for example, may comprise a plurality of power transmission coils disposed along a disposition surface on which a power receiving device that houses a power reception coil is disposed and a controller that determines a first traveling wave power that feeds the power transmission coil that corresponds to the disposed power receiving device based on a state of change of at least either an actual transmitted power actually transmitted from the power transmission coil to the power reception coil from among the traveling wave powers in a case where the traveling wave power that is a power transmitted to the power transmission coil is changed, or a reactive power not transmitted from the power transmission coil to the power reception coil from among the traveling wave powers.

In the non-contact power feeder according to one or more embodiments, for example, the controller, by determining the first traveling wave power fed to the power transmission coil corresponding to the disposed power receiving device based a state of change of at least either the actual transmitted power from among the traveling wave powers actually transmitted to the power reception coil from the power transmission coil or the reactive power from among the traveling wave powers not transmitted to the power reception coil from the power transmission coil, can set the first traveling wave power according to the power receiving device based on change characteristics (state) of the actual transmitted power (reactive power) that varies according to power reception characteristics of the power receiving device. The power receiving device can thereby be charged by transmitting the appropriate traveling wave power according to the power receiving device. Moreover, when simultaneously charging a plurality of power receiving devices, a traveling wave power suited to all power receiving devices can be distributed. Therefore, because the traveling wave power is relatively large, needless power consumption can be suppressed from increasing, and when distributing the traveling wave power, charging can be suppressed from taking excessive time due to the traveling wave power being relatively small. As a result, charging efficiency can be improved. Moreover, because the plurality of power receiving devices are charged simultaneously, enabling suitable distribution of power according to individual power receiving devices can shorten a time for all power receiving devices to complete charging.

In one or more embodiments, for example, the controller may be configured to determine the first traveling wave power based on a change amount of at least either the actual transmitted power or the reactive power, which opposes a change amount of the traveling wave power with a relationship between at least either the actual transmitted power or the reactive power and the traveling wave power. By configuring in this manner, the controller, based on a relationship between at least either the actual transmitted power or the reactive power and the traveling power, can easily determine the first traveling wave power, and improved charging efficiency can be easily provided.

In one or more embodiments, for example, the controller may be configured to obtain an inflection point between at least either the actual transmitted power or the reactive power and the traveling wave power and to determine the traveling wave power at a time when the inflection point is obtained as the first traveling wave power. By configuring in this manner, because the inflection point where the slope of the actual transmitted power decreases (the slop of the reactive power increases) when the traveling wave power increases can be made the first traveling wave power, charging can be performed more efficiently by the first traveling wave power that can charge most efficiently.

In one or more embodiments, for example, the controller may be configured to detect one or more power transmission coils, for which the actual transmitted power is the maximum value, as the power transmission coil that feeds the actual transmitted power to the disposed power receiving device by driving the plurality of power transmission coils on which the power receiving device is disposed and measuring the actual transmitted power. By configuring in this manner, the power receiving device can be charged more efficiently by using the power transmission coil of the maximum value, which can feed the greatest power to the power reception coil.

In one or more embodiments, for example, the controller may be configured to sequentially add and drive power transmission coils around the power transmission coil for which the actual transmitted power is the maximum value, detect the power transmission coil for which the actual transmitted power increases, and determine the power transmission coil cluster, which is a combination of one or more sets of power transmission coils used in power feeding, as the power transmission coil that feeds the actual transmitted power to the disposed power receiving device. By configuring in this manner, because detecting an increasing state of the actual transmitted power is restricted to power transmission coils around the maximum value, the power transmission coil that feeds the actual transmitted power can be efficiently determined. Moreover, unlike when determining the power transmission coil cluster that feeds the actual transmitted power by communicating between the non-contact power feeder and the power receiving device, there is no need to provide a communication part for communicating therebetween, and a configuration of the power receiving device and the non-contact power feeder can be simplified accordingly.

In one or more embodiments, for example, the power receiving device is disposed in a plurality on the disposition surface, and the controller may be configured to determine a second traveling wave power, which feeds to the power transmission coil, that corresponds to each power receiving device, based on a ratio of the first traveling wave power, which corresponds to each power receiving device instead of the first traveling wave power when a sum of the first traveling wave power corresponding to each power receiving device exceeds a power of a power feeding capacity of the non-contact power feeder. By configuring in this manner, even when the sum of the first traveling wave power corresponding to each of the plurality of power receiving devices exceeds the power feeding capacity of the non-contact power feeder, because the actual transmitted power is distributed based on the ratio of the first traveling wave power corresponding to the power receiving device, power can be fed in a balanced manner according to the power reception capacity of each power receiving device, and a time until all the power receiving devices complete charging can be shortened.

In one or more embodiments, for example, a plurality of pressure sensors disposed at intervals along the disposition surface that detects a position where the power receiving device is disposed on the disposition surface is further provided, wherein the actual transmitted power of only the power transmission coil near a position where the pressure sensor detects disposition of the power receiving device is measured. By configuring in this manner, because the actual transmitted power can be prevented from being measured for the power transmission coil in a position separated from the power receiving device that does not contribute to charging the power receiving device, the first traveling wave that feeds to the power transmission coil corresponding to the disposed power receiving device can be efficiently determined. Moreover, because the power transmission coil that measures the actual transmitted power can be easily detected, the power transmission coil can be efficiently selected.

In one or more embodiments, for example, a directional coupler is further provided, and the controller may be configured to calculate the actual transmitted power by reducing a reflected wave power from the traveling wave power measured by the directional coupler. By configuring in this manner, the directional couple can easily calculate the actual transmitted power.

In one or more embodiments, for example, the plurality of power receiving devices are disposed on the disposition surface, a display device that displays the power feeding state is further provided, and the display may be configured to display the size of the actual transmitted power corresponding to each of the plurality of power receiving devices during power feeding. By configuring in this manner, because the charging state is displayed on the display, a user can visually grasp the charging state of individual power receiving devices.

In one or more embodiments, for example, a plurality of lamps provided on the plurality of power transmission coils is further provided, and one or more lamps near the power transmission coil during power feeding are configured to light. By configuring in this manner, because the lamp lights corresponding to the power transmission coil, the user can visually grasp the size of the power transmission coil cluster.

In one or more embodiments, for example, the controller may be configured to continuously or at predetermined times measure the actual transmitted power transmitted to the power reception coil during power feeding and to stop charging the power receiving device by stopping power feeding when a drop in the actual transmitted power is detected. By configuring in this manner, the controller can detect the charging state based on the drop in the actual transmitted power and effectively prevent overcharging.

A non-contact power feeding method according to a one or more embodiments, for example, may comprise changing a traveling wave power that is a power transmitted to a plurality of power transmission coils disposed along a disposition surface on which a power receiving device housing a power reception coil is disposed, and determining a first traveling wave power that feeds to the power transmission coil corresponding to the disposed power receiving device based on a state of change of at least one of either an actual transmitted power actually transmitted from the power transmission coil to the power reception coil from among the traveling wave powers in a state where the traveling wave power is changed, or a reactive power not transmitted from the power transmission coil to the power reception coil from among the traveling wave powers.

In one or more embodiments, for example, by determining the first traveling wave power fed to the power transmission coil corresponding to the disposed power receiving device based a state of change of at least either the actual transmitted power from among the traveling wave powers actually transmitted to the power reception coil from the power transmission coil or the reactive power from among the traveling wave powers not transmitted to the power reception coil from the power transmission coil, can set the first traveling wave power according to the power receiving device based on change characteristics (state) of the actual transmitted power (reactive power) that varies according to power reception characteristics of the power receiving device. The power receiving device can thereby be charged by transmitting the appropriate traveling wave power according to the power receiving device. Moreover, when simultaneously charging a plurality of power receiving devices, a traveling wave power suited to all power receiving devices can be distributed. Therefore, because the traveling wave power is relatively large, needless power consumption can be suppressed from increasing, and when distributing the traveling wave power, charging can be suppressed from taking excessive time due to the traveling wave power being relatively small. As a result, charging efficiency can be improved.

According to one or more embodiments of the present invention, a wireless power feeder may comprise a plurality of coils and a controller that determines a first coil from the plurality of coils based on power transmitted from each of the plurality of coils to an external apparatus. The first coil receives power from a power source.

According to one or more embodiments of the present invention, a method of power feeding by a wireless power feeder comprising a plurality of coil, may comprise changing, with a gain amplifier, an actual transmitted power transmitted from each of the plurality of coils to an external apparatus, determining, with a controller, one of the plurality of coils as the first coil; and receiving, with the first coil, power from a power source. A slope of the actual transmitted power from the one of the plurality of coils may change at an inflection point.

According to one or more embodiments of the present invention, as described above, charging efficiency can be improved by reducing needless power consumption during charging and shorten the charging time.

BRIEF DESCRIPTION OF DRAWINGS

FIG. 6 is a flowchart illustrating a power feeding process executed by a controller of the non-contact power feeder according to one or more embodiments of the present invention.

DETAILED DESCRIPTION OF EMBODIMENTS

Embodiments of the present invention will be described below based on drawings.

A configuration of a non-contact power feeder (wireless power feeder) 100 according to one or more embodiments of the present invention will be described with reference to FIGS. 1 to 5.

Figure 1:
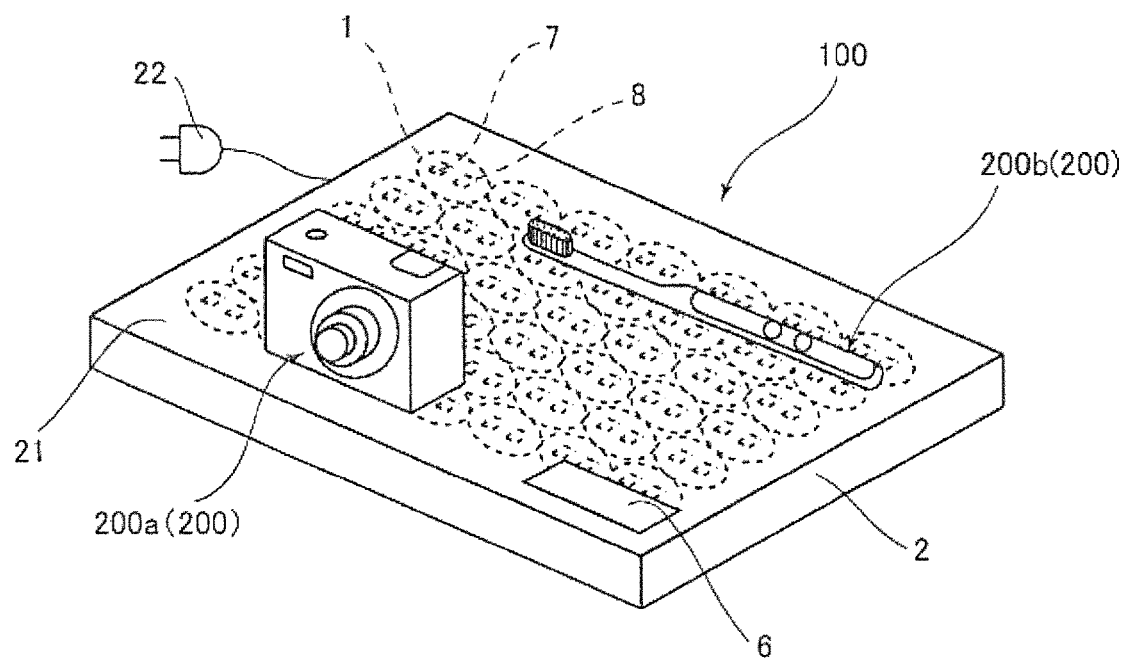
FIG. 1 is a perspective view illustrating a configuration where a non-contact power feeder according to one or more embodiments of the present invention is provided with a power receiving device.
Figure 2:
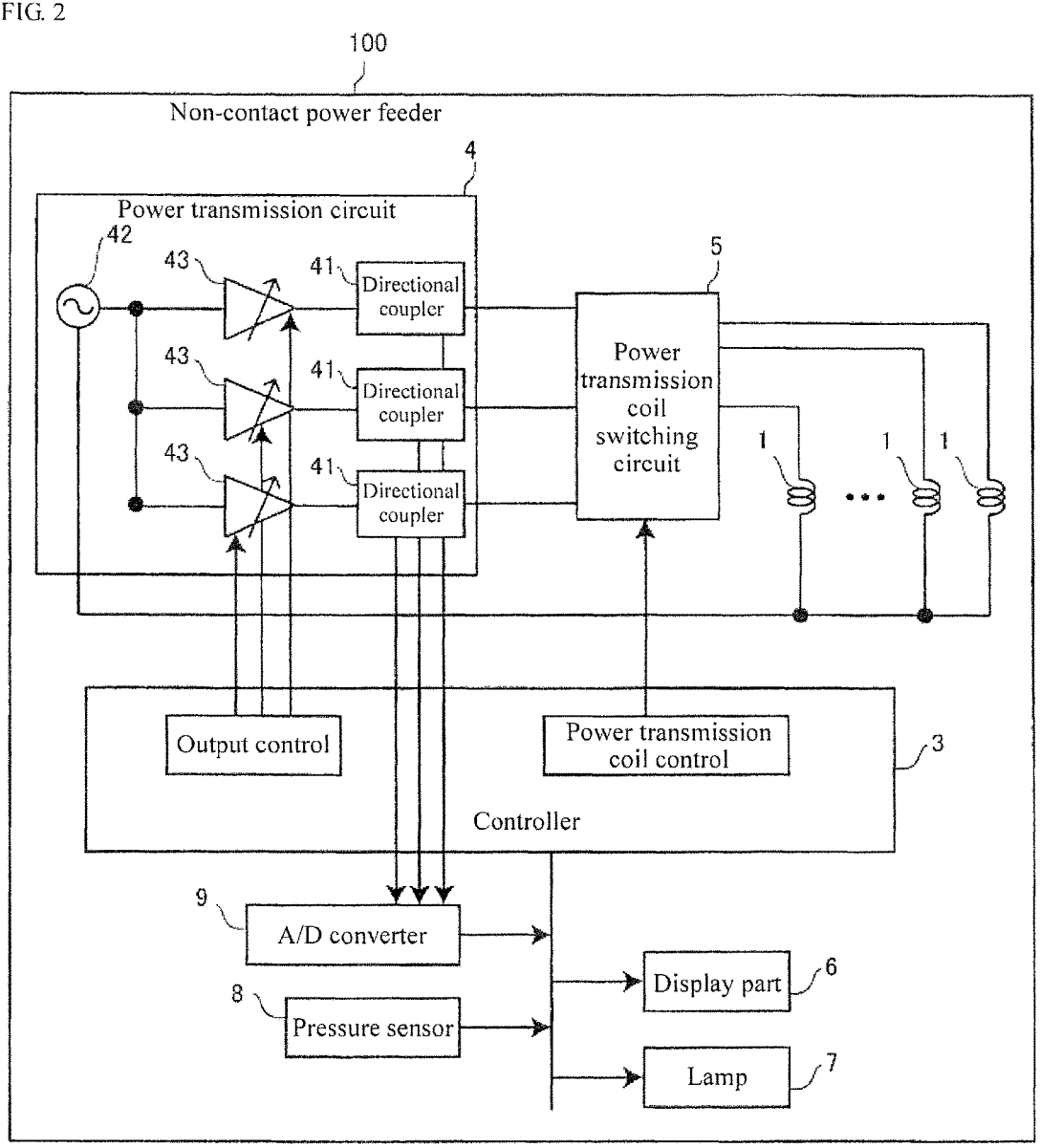
FIG. 2 is a block diagram illustrating a circuit configuration of the non-contact power feeder according to one or more embodiments of the present invention.
Figure 3:
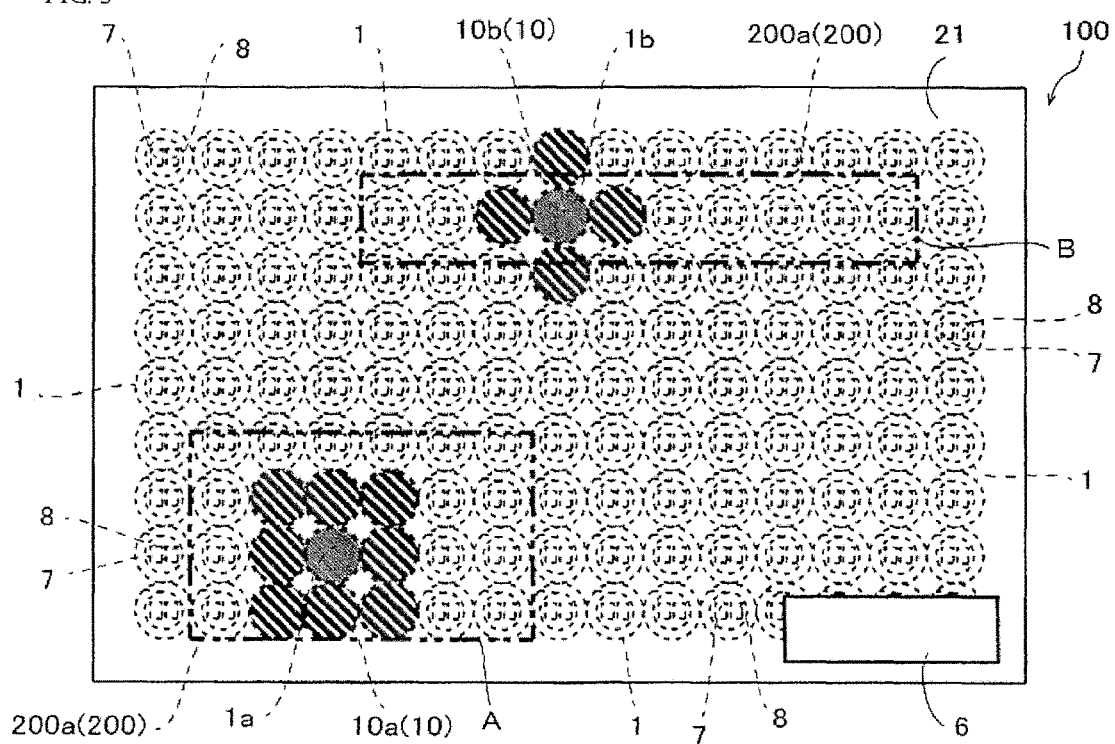
FIG. 3 is a planar view illustrating the non-contact power feeder according to one or more embodiments of the present invention.

As illustrated in FIGS. 1 to 3, the non-contact power feeder 100 according to one or more embodiments is provided with a power transmission coil 1, a rectangular, box-shaped enclosure 2 that houses the power transmission coil 1, and a controller 3 that performs controls such as changing a value of a traveling wave transmitted to the power transmission coil 1. Moreover, a disposition surface 21 for disposing a power receiving device (external apparatus) 200 to which power is transmitted is provided on an upper portion of the enclosure 2. Moreover, the power receiving device 200 has a power reception coil 20 that joins magnetically with the power transmission coil 1 inside the enclosure 2. Moreover, in FIG. 1, a state is illustrated where a camera 200a and an electric toothbrush 200b are disposed as the power receiving device 200. In this manner, the non-contact power feeder 100 is configured to enable simultaneously transmitting actual transmitted power to a plurality of power receiving devices 200 by the plurality of power receiving devices 200 being disposed on the disposition surface 21 of the non-contact power feeder 100. The actual transmitted power is then used to charge the power receiving device 200.

Furthermore, as illustrated in FIG. 2, in addition to the enclosure 2, the transmission coil 1, and the controller 3 described above, the non-contact power feeder 100 is mainly configured from a power transmission circuit 4, a power transmission coil switching circuit 5 that switches a transmission line to the power transmission coil 1, a display 6 that displays a power-feeding state, a lamp 7 provided on the power transmission coil 1, and a pressure sensor 8 that detects disposition of the power receiving device 200. Moreover, as illustrated in FIG. 1, the non-contact power feeder 100 is configured to feed power from a commercial power source via an adapter 22.

The controller 3 is connected to the power transmission circuit 4, the power transmission coil switching circuit 5, the display 6, and the pressure sensor 8 and is configured to control an overall operation of the non-contact power feeder 100. Moreover, the controller 3 is configured to perform a control that determines the value of the traveling wave power transmitted to the power transmission coil 1 from the power transmission circuit 4. Moreover, the controller 3 is configured to perform a control that switches the transmission line by the power transmission coil switching circuit 5 for transmitting the traveling wave power transmitted from the power transmission circuit 4 to a predetermined power transmission coil 1 from among a plurality of power transmission coils 1. Moreover, the controller 3 is configured to continuously or at predetermined times measure the actual transmitted power transmitted to the power reception coil 20 during power feeding and to stop charging the power receiving device 200 by stopping power feeding when a drop in the actual transmitted power is detected. The power receiving device 200 mounted with a secondary battery determines a drop in received power during charging as a full charge.

As illustrated in FIG. 3, the plurality of power transmission coils 1 is disposed in a matrix along the disposition surface 21 of the enclosure 2. Moreover, the power transmission coil 1 is configured in a circular shape. Moreover, each power transmission coil 1 is disposed near each other. Moreover, the power transmission coil 1 is configured to transmit the traveling wave power from the power transmission circuit 4. Moreover, a power transmission coil cluster 10, which is a cluster of power transmission coils 1, is formed in a position substantially corresponding to a disposition position of the power reception coil 20 of the power receiving device 200 and formed to enable power transmission to the power reception coil 20. Moreover, the power transmission coil cluster 10 to which the traveling wave power is transmitted is configured to generate a magnetic field around the power transmission coil cluster 10. The actual transmitted power is transmitted to the power reception coil 20 by this magnetic field. Moreover, strength of the magnetic field generated around the power transmission coil 1 increases as the traveling wave power transmitted to the power transmission coil 1 becomes larger. Moreover, the power transmission coil 1 is configured to feed a greater actual transmitted power to the power reception coil 20 as magnetic field strength increases. A method for determining the power transmission coil cluster 10 will be described below.

The power transmission circuit 4 includes a plurality of directional couplers 41 for detecting power, an oscillator 42, and a plurality of variable gain amplifiers 43 corresponding to the directional couplers. The directional coupler 41 is disposed between the variable gain amplifier 43 and the power transmission coil 1 and is configured to enable measuring the value of the traveling wave power. Moreover, the directional coupler 41 is configured to enable measuring a value of a reflected wave power (reactive power) not transmitted from the power transmission coil 1 to the power reception coil 20. Moreover, the traveling wave power and the reflected wave power measured by the directional coupler 41 are converted to a direct current by the A/D converter 9 and configured to be output to the controller 3. Moreover, the controller 3 is configured to enable calculating the actual transmitted power by reducing the reflected wave power (reactive power) from the traveling wave power that the directional coupler 41 obtained by measuring. Moreover, a condenser that is not illustrated is disposed between the variable gain amplifier 43 and the power transmission coil 1 as a matching element.

Furthermore, the oscillator 42 is configured to generate a high-frequency wave of a predetermined wavelength toward the variable gain amplifier 43 to obtain the traveling wave power. Moreover, the variable gain amplifier 43 is configured to enable outputting the traveling wave power of a needed value by amplifying the high-frequency wave of the predetermined wavelength received from the oscillator 42. Therefore, the controller 3 is configured to enable changing a power value of the traveling wave power, the magnetic field strength, and a value of the actual transmitted power to desired values, with a power feeding capacity of the non-contact power feeder 100 as a limit, by changing a value of a gain of the variable gain amplifier 43. Moreover, three variable gain amplifiers 43 are disposed in the power transmission circuit 4. A number of this variable gain amplifier 43 corresponds to a number of power receiving devices 200 to which the non-contact power feeder 100 can transmit actual transmitted power. Therefore, the non-contact power feeder 100 of the one or more embodiments is configured to enable simultaneously feeding the actual transmitted power to at most three power receiving devices 200. Moreover, when four or more power receiving devices 200 are disposed at one time, the non-contact power feeder 100 is configured to feed the actual transmitted power to three power receiving devices 200 disposed first.

Moreover, the display 6 is provided on the disposition surface 21 of the enclosure 2. Moreover, the display 6 is configured to display the size of the actual transmitted power corresponding to each power receiving device 200 during charging. Moreover, the display 6 is configured to enable displaying not only an actual transmitted current but also various types of other information.

Furthermore, as illustrated in FIG. 3, the lamp 7 is configured to be disposed one at a time on a position corresponding to each power transmission coil 1. Moreover, the lamp 7 is configured to be lighted by the controller 3 in correspondence with a nearby power transmission coil 1 during power feeding. Moreover, the lighted lamp 7 is configured to be turned off by the controller 3 in correspondence with a power transmission coil 1 that has completed transmitting the actual transmitted current when the power receiving device 200 has completed charging.

Furthermore, as illustrated in FIG. 3, a plurality of pressure sensors 8 is configured to be disposed at intervals along the disposition surface 21 of the enclosure 2. Moreover, the pressure sensors 8 are provided individually in positions that correspond to each power transmission coil 1. Moreover, the pressure sensor 8 is configured to enable detecting a position on the disposition surface 21 where the power receiving device 200 is disposed. Moreover, the directional coupler 41 is configured to measure the actual transmitted power of only the power transmission coil 1 near a disposition position when the pressure sensor 8 detects disposition of the power receiving device 200. Moreover, the controller 3 is configured to not transmit the traveling wave power if the power transmission coil 1 is not near a position where the pressure sensor 8 detects disposition of the power receiving device 200.

Figure 4:
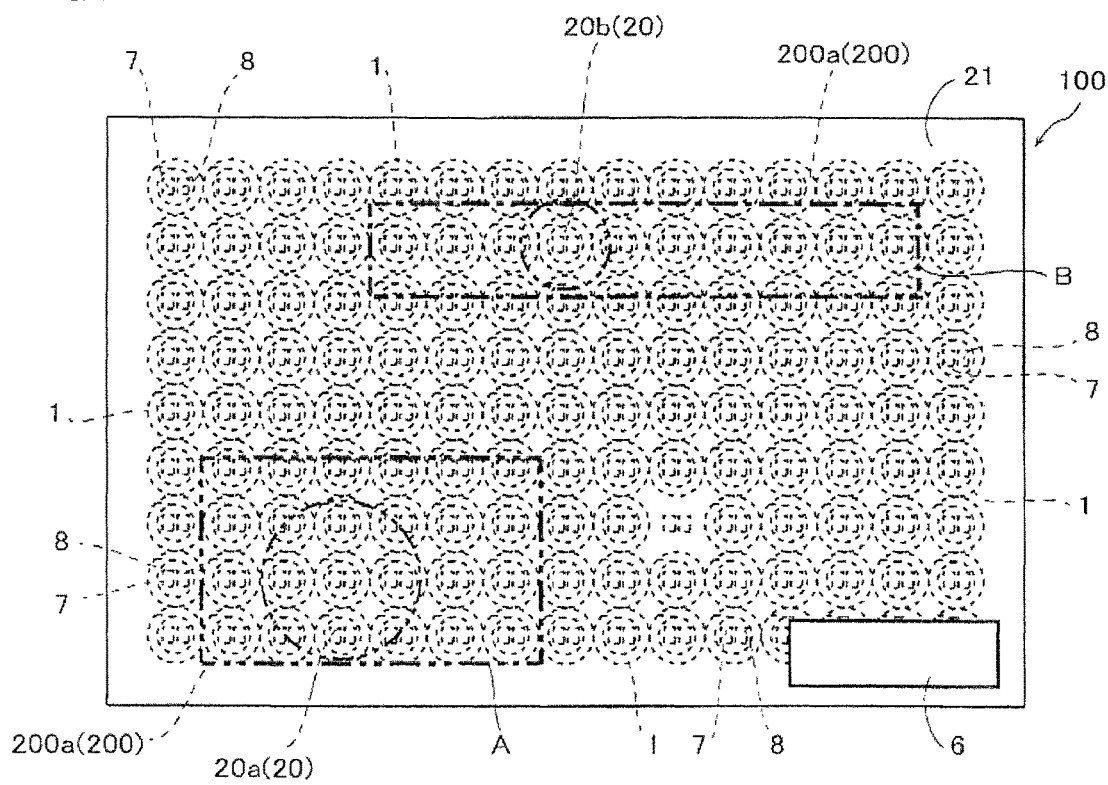
FIG. 4 is a planar view where a power reception coil of the power receiving device is disposed on the non-contact power feeder according to one or more embodiments of the present invention.

Next, a configuration of the control part 3 that determines which power transmission coil 1 transmits the actual transmitted power will be described with reference to FIGS. 1, 3, and 4.

The controller 3 is configured to measure the actual transmitted power by driving the plurality of power transmission coils 1 near the position where the pressure sensor 8 detects disposition of the power receiving device 200 at a predetermined traveling wave power. Moreover, the controller 3 is configured to detect one or more power transmission coils 1 with the actual transmitted power at a maximum value as the power transmission coil 1 that feeds the actual transmitted power to the disposed power receiving device 200. Moreover, the maximum value is detected for each power receiving device 200. Specifically, as illustrated in FIGS. 1 and 3, the controller 3 is configured to sequentially drive the plurality of coils 1 in a disposition region A (the region indicated by the two-dot chain line in FIG. 3) of the camera 200a detected by the pressure sensor 8 at the predetermined traveling wave power and calculate the actual transmitted power based on a detection result of the directional coupler 41. Moreover, as illustrated in FIG. 3, the controller 3 is configured to detect a power transmission coil 1a that takes the largest value (maximum value) of the actual transmitted power in a region of the disposition region A of the camera 200a. Moreover, the controller 3 is configured to sequentially drive the plurality of coils 1 in a disposition region B (the region indicated by the one-dot chain line in FIG. 3) of the electric toothbrush 200b detected by the pressure sensor 8 at the predetermined traveling wave power and calculate the actual transmitted power based on the detection result of the directional coupler 41. Moreover, the controller 3 is configured to detect a power transmission coil 1b that takes the largest value (maximum value) of the actual transmitted power in a region of the disposition region B of the electric toothbrush 200b.

Furthermore, the controller 3 is configured to sequentially add power transmission coils 1 near the power transmission coils 1a and 1b, for which the actual transmitted power is the maximum value, and detect the power transmission coils 1 for which the actual transmitted power increases. As a result, the controller 3 is configured to determine the power transmission coil cluster 10, which is a combination of the power transmission coils 1 used in power feeding, as the power transmission coil 1 that feeds the actual transmitted current to the disposed power receiving device 200. Specifically, the controller 3, as illustrated in FIG. 3, is configured to form power transmission coil clusters 10a and 10b (groups of power transmission coils 1 indicated by hatching) with the power transmission coils 1a and 1b that take the maximum value as the centers thereof. Moreover, the power transmission coil clusters 10a and 10b are configured so that the traveling wave power is transmitted therethrough and to transmit the actual transmitted power to the camera 200a and the electric toothbrush 200b. Moreover, as illustrated in FIGS. 3 and 4, the power transmission coil clusters 10a and 10b are configured so sizes thereof are about the same size as corresponding power reception coils 20a and 20b.

Next, the configuration of the controller 3 that determines the traveling wave power for charging the power receiving device 200 will be described with reference to FIGS. 1 and 3.

Figure 5:
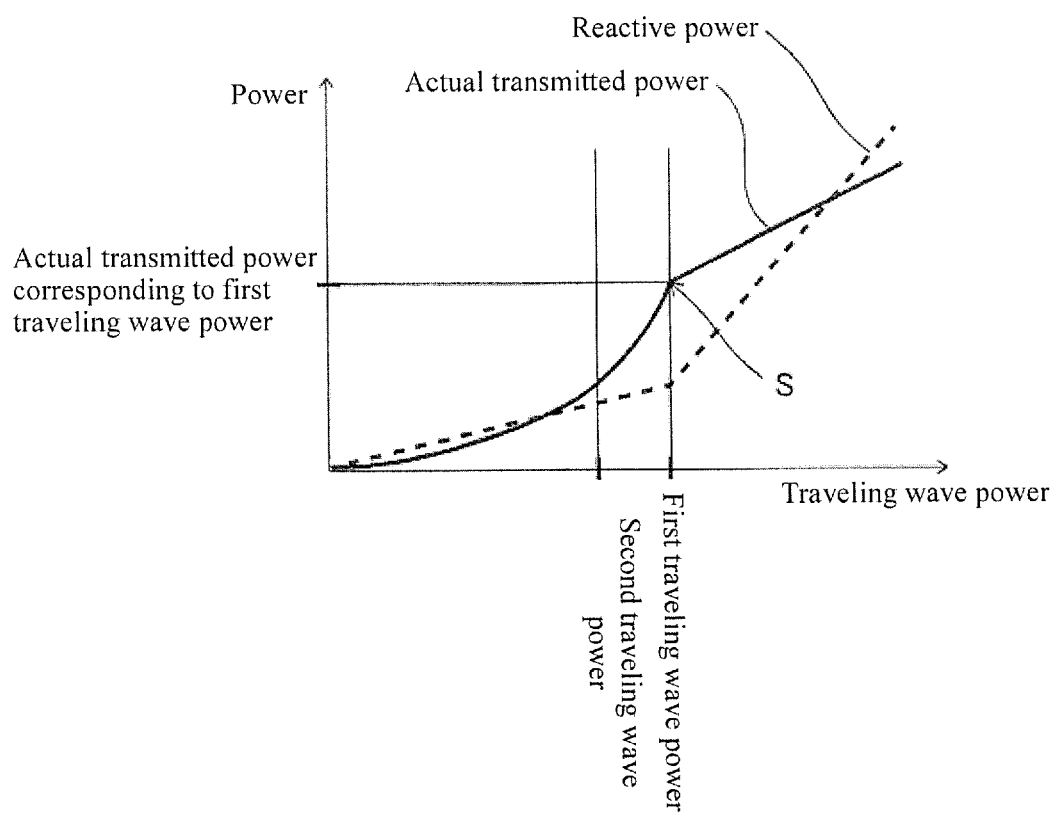
FIG. 5 is a graph illustrating a relationship between a traveling wave power, an actual transmitted power, and a reactive power of the non-contact power feeder according to one or more embodiments of the present invention.

Here, as illustrated in FIG. 5, the controller 3 in one or more embodiments is configured to obtain an inflection point S of a slope in a case where a relationship between the actual transmitted power and the traveling wave power is graphed. Here, to obtain the traveling wave power that actually takes the inflection point S (first traveling wave power), first, the traveling wave power is gradually increased from a small value by gradually increasing a variable gain amplifier 43 gain. At this time, the controller 3 continuously measures a power value of the actual transmitted power. Moreover, a slope of the actual transmitted current gradually increases as the traveling wave power increases. Moreover, there is a point (inflection point S) where the slope of the actual transmitted power suddenly decreases at a predetermined value of the traveling wave power as the traveling wave power is increased.

Furthermore, the controller 3 is configured to actually feed the actual transmitted power to the power receiving device 200 by the traveling wave power (first traveling wave power) in the obtained inflection point S. There is a relationship between the actual transmitted power, the traveling wave power, and the reactive power where the actual transmitted power is the power value after reducing the reactive power from the traveling wave power. Therefore, it is of course possible to obtain the first traveling wave power for feeding the actual transmitted power to the power receiving device 200 by a relationship between the reactive power and the traveling wave power. Here, a reason the inflection point S arises in a relationship between the traveling wave power and the actual transmitted power is because an impedance of the power receiving device 200 seen from the non-contact power feeder 100 rises when more of the actual transmitted power is fed to the power receiving device 200 than is needed, and this is because the power receiving device 200 does not consume more power than a power needed for operation and charging.

Furthermore, the controller 3 is configured to transmit the traveling wave power to the power transmission coil 1 as the traveling wave power reduced to a power feeding capacity when the traveling wave power (first traveling wave power) at the inflection point S exceeds the power feeding capacity of the non-contact power feeder 100. Moreover, the controller 3 is configured to determine a second traveling wave power, which corresponds to the first power transmission coil 1, that corresponds to each power receiving device 200. This is done based on a ratio of the first traveling wave power, which corresponds to each power receiving device 200 instead of the first traveling wave power when a sum of the first traveling wave power corresponding to each power receiving device 200 exceeds a power of a power feeding ability limit of the non-contact power feeder 100. Specifically, if the power feeding capacity of the non-contact power feeder is 5 W, the first traveling wave power corresponding to the power transmission to the camera 200a is 4 W, and the first traveling wave power corresponding to the power transmission to the electric toothbrush 200b is 2 W, the controller 3 distributes the 5 W at a ratio of 4:2 to the camera 200a and the electric toothbrush 200b. That is, second traveling wave powers of 10/3 W and 5/3 W are transmitted respectively to the power transmission coil clusters 10a and 10b, which transmit power to the camera 200a and the electric toothbrush 200b.

Next, a power feeding process executed by the controller 3 of the non-contact power feeder 100 according to one or more embodiments will be described with reference to FIGS. 1, 3, and 6.

In step S1, the controller 3 uses the pressure sensor 8 to determine whether the power receiving device 200 is disposed on the disposition surface 21 of the non-contact power feeder 100. If the power receiving device 200 is not disposed, the process returns again to S1. If the power receiving device 200 is disposed, the process proceeds to step S2.

Next, as illustrated in FIGS. 3 and 6, in step S2, the control part 3 detects the power transmission coils 1a and 1b for which the actual transmitted power takes the maximum value. The process then proceeds to step S3.

Next, as illustrated in FIG. 3, in step S3, the controller 3 determines the power transmission coil clusters 10a and 10b, which are combinations of the power transmission coils 1 used in power transmission, with the power transmission coils 1a and 1b that take the maximum value as the centers thereof. At this time, the power reception coil 20 of the power receiving device 200 and the power transmission coil cluster 10 become about the same size. A coupling coefficient can therefore be made larger. The process then proceeds to step S4.

Next, in step S4, the controller 3 determines the traveling wave power (first traveling wave power) transmitted to the power transmission coils 1a and 1b. The process then proceeds to step S5.

Next, in step S5, the controller 3 starts transmitting actual transmitted power to the power reception coil 20a of the camera 200a. Moreover, the controller 3 starts transmitting actual transmitted power to the power reception coil 20b of the electric toothbrush 200b. The process then proceeds to step S6. When the controller 3 starts transmitting the traveling wave power to the power transmission coil clusters 10a and 10b, the lamp 7 that corresponds to positions of the power transmission coil clusters 10a and 10b is lighted.

Next, in step S6, the controller 3 sets i to i=1 and selects one power transmission coil cluster 10a to control. The "i" indicates a setting value of any integer 1 to n+1 and means each power transmission coil cluster 10a and 10b. That is, changing the value of i changes the power transmission coil cluster 10 to be controlled. Moreover, a value of n indicates a number of power receiving devices 200 disposed on the non-contact power feeder 100. Therefore, n becomes n=2

(two devices of the camera 200*a* and the electric toothbrush 200*b*). The process then proceeds to step S7.

Next, in step S7, the controller 3 determines whether charging completion is detected for the power transmission coil cluster 10*a*. Then, if charging completion is not detected, the process proceeds to step S8. The controller 3 is measured continuously or at predetermined intervals and determines charging completion when the actual transmitted power is at or below a predetermined value. Moreover, charging completion is detected not only when the power receiving device 200 completes charging but also when the power receiving device 200 is removed from the non-contact power feeder 100.

Next, in step S8, the controller 3 adds 1 to i. That is, i is set to i=2. An object of control thereby changes from the power transmission coil cluster 10*a* to the power transmission coil cluster 10*b*. The process then proceeds to step S9.

Next, in step S9, it is determined whether i and n+1 are equivalent. Here, because i=2 and n=2, the controller 3 determines that i and n+1 are not equivalent. The process then returns to step S7.

Next, in step S7, the controller 3 determines whether charging completion is detected for the power transmission coil cluster 10*b*. Then, if the controller 3 does not detect charging completion, the process proceeds to step S8, 1 is added to the value of i, becoming i=3. Then, in step S9, because i=3 and n=2, the controller 3 determines that i and n+1 are equivalent. The process then returns to step S6.

Next, in step S6, the controller 3, as described above, again sets i to i=1 and selects to control the power transmission coil cluster 10*a*. In this manner, steps S6 to S9 repeat for some time after starting charging. That is, the controller 3 repeatedly and alternately determines whether charging completion is detected for the power transmission coil clusters 10*a* and 10*b*.

Then, as a result of steps S6 to S9 described above being repeated, in step S7, the controller 3 detects charging completion for the power transmission coil cluster 10*a* for which i=1. The process then proceeds to step S10.

Next, in step S10, the controller 3 stops power transmission to the power transmission coil cluster 10*a*. The process then proceeds to step S11. The lamp 7 that corresponds to the position of the power transmission coil cluster 10*a* is also turned off when power transmission to the power transmission coil cluster 10*a* stops.

Next, in step S11, the controller 3 determines whether power transmission to all the power transmission coil clusters 10*a* and 10*b* is stopped. At this point, because the power transmission coil cluster 10*b* has not completed charging, the process proceeds to step S8. The controller 3 then again repeatedly determines whether charging completion is detected. Then, in step S7, the controller 3 also detects charging completion for the power transmission coil cluster 10*b*. After this, through step S10 and in step 11, the controller 3 determines that power transmission to all of the power transmission coil clusters 10*a* and 10*b* is stopped. A power feeding process flow ends at this point.

Moreover, in one or more embodiments, the controller 3, by determining the first traveling wave power fed to the power transmission coil 1 corresponding to the disposed power receiving device 200 based a state of change of at least either the actual transmitted power from among the traveling wave powers actually transmitted to the power reception coil 20 from the power transmission coil 1 or the reactive power from among the traveling wave powers not transmitted to the power reception coil 20 from the power transmission coil 1, can set the first traveling wave power according to the power receiving device 200 based on change characteristics (state) of the actual transmitted power (reactive power) that varies according to power reception characteristics of the power receiving device 200. The power receiving device 200 can thereby be charged by transmitting an appropriate traveling wave power according to the power receiving device 200. Moreover, when simultaneously charging a plurality of power receiving devices 200, a traveling wave power suited to all power receiving devices 200 can be distributed. Therefore, because the traveling wave power is relatively large, needless power consumption can be suppressed from increasing, and when distributing the traveling wave power, charging can be suppressed from taking excessive time due to the traveling wave power being relatively small. As a result, charging efficiency can be improved. Moreover, because the plurality of power receiving devices are charged simultaneously, enabling suitable distribution of power according to individual power receiving devices can shorten a time for all power receiving devices to complete charging.

Furthermore, in one or more embodiments, the controller 3 is configured to determine the first traveling wave power based on a change amount of at least either the actual transmitted power or the reactive power, which opposes a change amount of the traveling wave power with a relationship between at least either the actual transmitted power or the reactive power and the traveling wave power.

Furthermore, in one or more embodiments, the controller 3 is configured to obtain the inflection point S between at least either the actual transmitted power or the reactive power and the traveling wave power and to determine the traveling wave power at a time when the inflection point S is obtained as the first traveling wave power. By this, because the inflection point where the slope of the actual transmitted power decreases (the slop of the reactive power increases) when the traveling wave power increases can be made the first traveling wave power, charging can be performed more efficiently by the first traveling wave power that can charge most efficiently.

Furthermore, in one or more embodiments, the controller 3 is configured to detect one or more power transmission coils 1, for which the actual transmitted power is the maximum value, as the power transmission coil 1 that feeds the actual transmitted power to the disposed power receiving device 200 by driving the plurality of power transmission coils 1 on which the power receiving device 200 is disposed and measuring the actual transmitted power. By this, the power receiving device 200 can be charged more efficiently by using the power transmission coil 1 of the maximum value, which can feed the greatest power to the power reception coil 20.

Furthermore, in one or more embodiments, the controller 3 is configured to sequentially add and drive power transmission coils 1 around the power transmission coil 1 for which the actual transmitted power is the maximum value, detect the power transmission coil 1 for which the actual transmitted power increases, and determine the power transmission coil cluster 10, which is a combination of one or more sets of power transmission coils 1 used in power feeding, as the power transmission coil 1 that feeds the actual transmitted power to the disposed power receiving device 200. By this, because detecting an increasing state of the actual transmitted power is restricted to power transmission coils 1 around the maximum value, the power transmission coil 1 that feeds the actual transmitted power can be efficiently determined. Moreover, unlike when determining the power transmission coil cluster 10 that feeds the actual transmitted power by communicating between the non-contact power feeder 100 and the power receiving device 200, there is no need to provide a communication part for communicating therebetween, and a configuration of the power receiving device 200 and the non-contact power feeder can be simplified accordingly.

Moreover, in one or more embodiments, the plurality of power receiving devices 200 is configured to be disposed on the disposition surface 21, and the controller 3 is configured to determine the second traveling wave power, which feeds to the power transmission coil 1 corresponding to each power receiving device 200. This is done based on the ratio of the first traveling wave power, which corresponds to each power receiving device 200 instead of the first traveling wave power when the sum of the first traveling wave power corresponding to each of the plurality of power receiving devices 200 exceeds the power feeding capacity of the non-contact power feeder 100. By this, even when the sum of the first traveling wave power corresponding to each of the plurality of power receiving devices 200 exceeds the power feeding capacity of the non-contact power feeder 100, because the actual transmitted power is distributed based on the ratio of the first traveling wave power corresponding to the power receiving device 200, power can be fed in a balanced manner according to the power reception capacity of each power receiving device 200, and a time until all the power receiving devices 200 complete charging can be shortened.

Furthermore, in one or more embodiments, the plurality of pressure sensors 8 disposed at intervals along the disposition surface 21 and that detect the position where the power receiving device 200 is disposed on the disposition surface 21 is provided, and the pressure sensor 8 measures the actual transmitted power of only the power transmission coil 1 near the position where disposition of the power receiving device 200 is detected. By this, because the actual transmitted power can be prevented from being measured for the power transmission coil 1 in a position separated from the power receiving device 200 that does not contribute to charging the power receiving device 200, the first traveling wave that feeds to the power transmission coil 1 corresponding to the disposed power receiving device 200 can be efficiently determined Moreover, because the power transmission coil 1 that measures the actual transmitted power can be easily detected, the power transmission coil 1 can be efficiently selected.

Furthermore, in one or more embodiments, the directional coupler is provided, and the controller 3 is configured to calculate the actual transmitted power by reducing the reflected wave power from the traveling wave power measured by the directional coupler. By this, the directional couple 41 can easily calculate the actual transmitted power.

Furthermore, in one or more embodiments, the plurality of power receiving devices are disposed on the disposition surface, the display device 6 that displays the power feeding state is provided, and the display 6 is configured to display the size of the actual transmitted power corresponding to each of the plurality of power receiving devices 200 during power feeding. By this, because the charging state is displayed on the display 6, a user can visually grasp the charging state of individual power receiving devices 200.

Furthermore, in one or more embodiments, the plurality of lamps 7 provided on the plurality of power transmission coils 1 is provided, and one or more lamps 7 near the power transmission coil 1 during power feeding are configured to light. By this, because the lamp 7 lights corresponding to the power transmission coil 1, the user can visually grasp the size of the power transmission coil cluster 10.

Furthermore, in one or more embodiments, the controller 3 is configured to continuously or at predetermined times measure the actual transmitted power fed to the power reception coil 20 during power feeding and to stop charging the power receiving device 200 by stopping power feeding when the drop in the actual transmitted power is detected. By this, the controller 3 can detect the charging state based on the drop in the actual transmitted power and effectively prevent overcharging.

Moreover, one or more embodiments, by determining the first traveling wave power fed to the power transmission coil 1 corresponding to the disposed power receiving device 200 based the state of change of at least either the actual transmitted power from among the traveling wave powers actually transmitted to the power reception coil 20 from the power transmission coil 1 or the reactive power from among the traveling wave powers not transmitted to the power reception coil 20 from the power transmission coil 1, can set the first traveling wave power according to the power receiving device 200 based on the change characteristics (state) of the actual transmitted power (reactive power) that varies according to the power reception characteristics of the power receiving device 200. The power receiving device 200 can thereby be charged by transmitting the appropriate traveling wave power according to the power receiving device 200. Moreover, when simultaneously charging the plurality of power receiving devices 200, the traveling wave power suited to all power receiving devices 200 can be distributed. Therefore, because the traveling wave power is relatively large, needless power consumption can be suppressed from increasing, and when distributing the traveling wave power, charging can be suppressed from taking excessive time due to the traveling wave power being relatively small. As a result, charging efficiency can be improved.

The embodiments herein disclosed are examples and should not be considered as limiting. The scope of the present invention is indicated by the scope of patent claims, not the description of the embodiments described above, and, moreover, includes meanings equivalent to the scope of patent claims and all modification within the scope.

For example, in the embodiments described above, the circular power transmission coil is described as an example of the power transmission coil of the present invention, but the present invention is not limited thereto. The present invention may have a power transmission coil of a shape other than a circle, such as a rectangle.

Furthermore, in the embodiments described above, the direction coupler detects the actual transmitted power, but the present invention is not limited thereto. In the present invention, a current and a voltage may be detected to detect the actual transmitted power from a vector product of the current and the voltage.

Furthermore, in the embodiment described above, an example is described where the variable gain amplifier changes the traveling wave power, but the present invention is not limited thereto. In the present invention, the traveling wave power may be changes by a method that changes a power source voltage of an amplifier or a method that thins out the high-frequency wave generated by the oscillator by a half-cycle unit.

Furthermore, in the embodiment described above, an example is described where the pressure sensor detects disposition of the power receiving device, but the present invention is not limited thereto. In the present invention, disposition of the power receiving device may be detected by something other than the pressure sensor, for example, by detecting disposition of the power receiving device by an acceleration sensor.

Furthermore, in the embodiments described above, an example is described where a light is disposed on the position corresponding to each power transmission coil, but the present invention is not limited thereto. In the present invention, the light may be disposed in correspondence with the plurality of power transmission coils nearby.

Furthermore, in the embodiments described above, an example is described where the pressure sensor is disposed on the position corresponding to each power transmission coil, but the present invention is not limited thereto. In the present invention, the pressure sensor may be disposed in correspondence with the plurality of power transmission coils nearby.

Furthermore, in the embodiments described above, an example is described where one maximum value is detected for each power receiving device, but the present invention is not limited thereto. In the present invention, a plurality of maximum values may be detected for each power receiving device. Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims

EXPLANATION OF REFERENCE NUMERALS 1, 1a, 1b Power transmission coil
3 Controller
6 Display
7 Lamp
8 Pressure sensor
10, 10a, 10b Power transmission coil cluster
20, 20a, 20b Power reception coil
21 Disposition surface
41 Directional coupler
100 Non-contact power feeder
200 Power receiving device
200a Camera (power receiving device)
200b Electric toothbrush (power receiving device)

What is claimed is:

1. A wireless power feeder, comprising:
a plurality of coils; and
a controller configured to determine a first coil from the plurality of coils based on power transmitted from each of the plurality of coils to an external apparatus,
wherein the first coil receives power from a power source,
wherein the controller is configured to determine the first coil based on at least one of an actual transmitted power from each of the plurality of coils and a reactive power from each of the plurality of coils,
wherein the actual transmitted power is transmitted from one of the plurality of coils to the external apparatus, and
wherein the reactive power is not transmitted from any of the plurality of coils to the external apparatus.

2. The wireless power feeder according to claim 1, wherein the actual transmitted power from the first coil is greater than the actual transmitted power from each of the other coils.

3. The wireless power feeder according to claim 2, further comprising:
a gain amplifier, wherein
the controller is configured to cause the gain amplifier to change the actual transmitted power from each of the plurality of coils, and
the controller is configured to detect a coil from the plurality of coils that transmits the greatest actual transmitted power.

4. The wireless power feeder according to claim 1, further comprising:
a plurality of pressure sensors, disposed at intervals along a disposition surface, that detects a position where the external apparatus is disposed on the disposition surface, wherein
the power source transmits power to the coil near a position where the plurality of pressure sensors detects disposition of the external apparatus is measured.

5. The wireless power feeder according to claim 1, further comprising:
a directional coupler that measures the reactive power.

6. The wireless power feeder according to claim 1, wherein
at least one more external apparatus is disposed on a disposition surface, wherein the wireless power feeder further comprises:
a display that displays a charging state and a size of the actual transmitted power corresponding to each external apparatus during charging.

7. The wireless power feeder according to claim 1, further comprising:
a plurality of lamps provided on the coil, wherein
one or more of the lamps near the coil light up during charging.

8. The wireless power feeder according to claim 1, wherein the controller continuously or at predetermined times measures the actual transmitted power during power feeding and stops charging the external apparatus when a drop in the actual transmitted power is detected.

9. The wireless power feeder according to claim 1, wherein
the external apparatus is a power receiving device comprising a power reception coil, and
the plurality of coils feed power to the power reception coil.

10. A wireless power feeder, comprising:
a plurality of coils; and
a controller configured to determine a first coil from the plurality of coils based on power transmitted from each of the plurality of coils to an external apparatus,
wherein the first coil receives power from a power source,
wherein the controller is configured to determine the first coil based on a change of a slope of at least one of an actual transmitted power from each of the plurality of coils and a reactive power from each of the plurality of coils,
wherein the actual transmitted power is transmitted from one of the plurality of coils to the external apparatus, and
wherein the reactive power is not transmitted from any of the plurality of coils to the external apparatus.

11. The wireless power feeder according to claim 10, wherein
the slope of the actual transmitted power from the first coil changes at an inflection point.

12. The wireless power feeder according to claim 11, wherein the controller is configured to determines power corresponding to the inflection point as the power from the power source.

13. The wireless power feeder according to claim 11, further comprising:
a gain amplifier, wherein
the controller is configured to cause the gain amplifier to change the actual transmitted power from each of the plurality of coils, and
the controller is configured to obtain the inflection point where the slope of the actual transmitted power changes.

14. A wireless power feeder, comprising:
a plurality of coils; and
a controller configured to determine a first coil from the plurality of coils based on power transmitted from each of the plurality of coils to an external apparatus,
wherein the first coil receives power from a power source,
wherein at least a second coil from the plurality of coils receives power from the power source,
wherein the second coil is adjacent to the first coil, and
wherein the controller is configured to determine strength of a magnetic field generated by the first coil and the second coil based on reception power needed by the external apparatus.

15. The wireless power feeder according to claim 14, wherein when reception power needed by the external apparatus is greater than power that is transmittable from the first coil and the second coil, the controller adjusts power transmitted from the first coil and the second coil to the external apparatus.

16. The wireless power feeder according to claim 15, wherein
the first coil and the adjacent second coil make up a set,
the controller is configured to determine, based on the power transmitted from each of the plurality of coils to an external apparatus, at least one more set of adjacent coils, from the plurality of coils, that receive power from the power source,
one or more of the sets define a cluster, and
the controller is configured to adjust the power for the cluster.

* * * * *